Nov. 26, 1940.   E. G. TOUCEDA ET AL   2,222,788
PRESERVED PHOTOELECTRICAL CELL
Filed Sept. 4, 1937
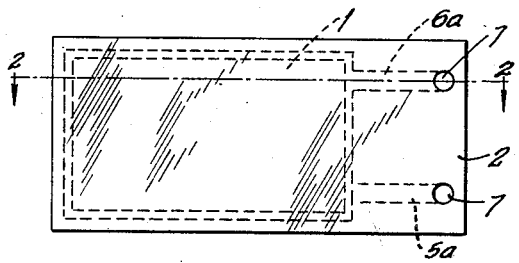
FIG.1
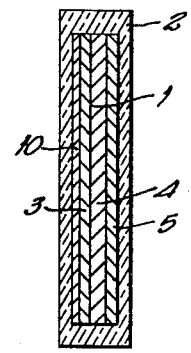
FIG.6
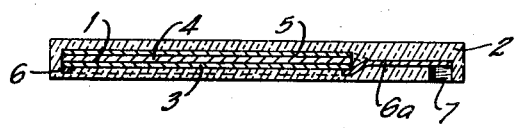
FIG.2
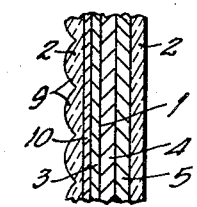
FIG.7
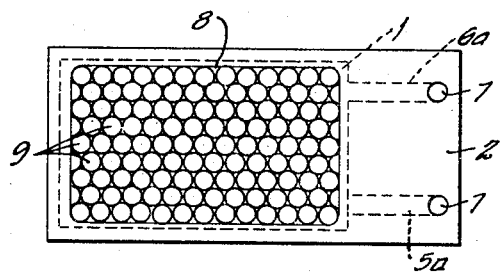
FIG.3
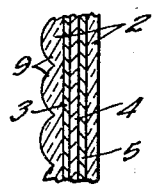
FIG.5
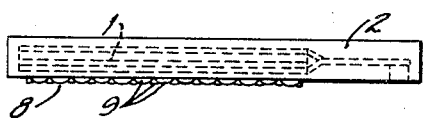
FIG.4
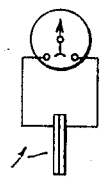
FIG.8
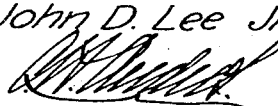
INVENTORS
Enrique G. Touceda
John D. Lee Jr.
By
ATTORNEY Patented Nov. 26, 1940

2,222,788

UNITED STATES PATENT OFFICE 2,222,788

PRESERVED PHOTOELECTRICAL CELL

Enrique G. Touceda, Loudonville, and John D. Lee, Jr., Schenectady, N. Y.

Application September 4, 1937, Serial No. 162,558

1 Claim. (Cl. 136—89)

Our invention particularly relates to an article of manufacture comprising a photoelectrical cell adapted to generate an electromotive force upon subjection to light, which cell is embedded in a body of translucent material whereby impairment of the operation of the cell due to elemental attack such as occurs when exposed to the atmosphere and media of a deleterious nature is entirely prevented.

In many instances, especially where photoelectrical cells are designed for portability or where intended for use under conditions promoting cell reduction, comparatively thin glass covers are resorted to as a protection. Obviously, it is impossible in this manner fully to protect the cells against attack.

It is, therefore, a first object of our invention to provide a photoelectrical cell which is completely and fully preserved or protected against attack from substantially all common deleterious media or elements; and, in order to effect such preservation without detracting in any way from the efficiency of the cell, we have determined that a preservative having all of the essential characteristics, for the reasons hereinafter pointed out, consists of methyl methacrylate, a polymerized derivative of methacrylic acid, now known to the trade as "Lucite," formerly as "Pontalite."

Photoelectrical cells are those units comprising substances such, for example, as copper oxide and iron selenide which upon subjection to light are activated to generate an electromotive force of the order of millivolts. The current output is proportionate to the intensity of the activating light and when employing, for example, a low resistance galvanometer in circuit therewith, the measured current output bears a constant relationship to the light intensity or, in other words, their relation is linear. Under these circumstances, the galvanometer may be calibrated to indicate foot candles, or, when the photoelectrical cell is employed in the art of photography, calibrations may be made in terms of camera-diaphragm settings.

We have illustrated and in the following will describe our invention relative to its adaptation to photography, in the main for exemplary purposes, because in pointing out its adaptability for use in this field, it becomes apparent that objectives are attained in our invention which are additional to those basically requisite to its use in other arts.

In the art of photography, light measuring instruments have been used employing photoelectrical cells of the foregoing type connected with a meter for the purpose of measuring light intensity and affording an indication of the theoretically correct diaphragm setting for cameras under various illuminating conditions. Accuracy is an important factor in these instruments and to insure both accuracy and prolongation of the useful life of the light-sensitive element, our invention contemplates the provision of a photoelectrical cell having at least those portions thereof which are susceptible of elemental attack embedded in a molded body of methyl methacrylate.

A first highly desirable characteristic of methyl methacrylate which adapts the same as a preservative of light-sensitive elements is found in its low-temperature molding property. The light-sensitive surface of photoelectrical cells is greatly impaired if subjected to excessive temperatures. However, due to the fact that the temperature at which methyl methacrylate can be molded is below those affecting such cells, a body of methyl methacrylate may be molded over and directly in contact with the light-sensitive surfaces thereof.

Other important characteristics of methyl methacrylate reside in its moldability in a clear, translucent body and in the fact that such transparent thermoplastic has extremely good light-transmission properties, superior to glass. Hence, such material is especially desirable as a preservative for photoelectric cells because, due to its extremely high light-transmission properties, the working range of the light-sensitive element is increased thereby affording greater precision in instrument readings.

It is also important to note that methyl methacrylate is substantially inert to all common media rendering the same of value for all ordinary usages and adaptable even where special conditions must be considered and met.

For example and with reference to the art of photography, it is often desirable to restrict the light measured to certain zones of reflection. In its exposure, a film is subjected to all light rays reflected within the angular extent of the camera lens. In order properly, therefore, to measure the light to which the film is to be subjected, it is desirable to restrict the light falling on the light-sensitive element to the same degree as is effected by the camera lens. In other words, light falling on the photoelectric cell should first pass through a lens substantially of the same degree as the camera lens. For ordinary, practical purposes, lenses of 30° and 60° have been found satisfactory and lenses of this character are almost universally employed with cameras and instruments of the so-called exposure-meter type.

In view of the unique properties of methyl methacrylate, above noted, it may be molded into a body having a photoelectrical cell embedded therein and that portion thereof overlying the cell may be molded to form a lens and our invention contemplates the provision of an article of this character as a further object thereof.

In addition to light control by lenses, it is customary to employ light filters to permit only certain wave lengths of light to affect the light-sensitive film. Color filtration produces much better photographic results than could be obtained in an absence thereof, particularly in bringing out details which would otherwise be obscured because of intense light reflection occurring in or about the zone of such detail and of a color to which the film is highly sensitive.

A further object of our invention, therefore, resides in the provision of a molded body having embedded therein a photoelectrical cell and comprising a color filter disposed to overlie said cell and intercept light rays of a given order of wave length directed thereon.

With these and other objects in view, our invention includes the novel elements and the combinations and arrangements thereof described below and illustrated in the accompanying drawing, in which—

Fig. 1 is an elevation view of a molded body having a photoelectrical cell embedded therein;

Fig. 2 is a sectional view taken through the body and cell of Fig. 1 in about the plane 2—2 thereof;

Fig. 3 is an elevation view of a body having a lens molded in a face thereof;

Fig. 4 is a plan view of the body of Fig. 3;

Fig. 5 is a fragmentary, vertical sectional view through the structure of Fig. 3 to a somewhat enlarged scale;

Fig. 6 is a vertical section through a body having molded therein a light-sensitive cell and a color filter;

Fig. 7 is a view similar to Fig. 5 illustrating a photoelectrical cell and color filter preserved in a body embodying an integrally molded lens; and Fig. 8 represents diagrammatically a light-sensitive cell and galvanometer hook-up.

A photoelectrical cell, represented generally by the numeral 1, is shown embedded in a molded body 2 of translucent material which, for the reasons hereinbefore advanced, preferably consists of methyl methacrylate, a polymerized derivative of methacrylic acid. Methyl methacrylate may be molded at temperatures below those producing impairment to the light-sensitive surfaces of the photoelectric cells which factor, of course, is of prime importance in determining the material best suited for cell-preserving purposes. For ordinary uses, the molded body comprises a clear, transparent mass which wholly preserves the light-sensitive element from elemental attack. At the same time, due to the excellent light-transmission property of molded methyl methacrylate which is superior even to glass, as hereinbefore noted, the readings afforded by associated instruments may be much more precise than in those cases where the photoelectrical cell is covered with a glass.

The photoelectrical cell 1 is illustrated as comprising elements 3 and 4 which, respectively may consist of copper oxide and iron selenide. A backing sheet 5 of suitable material such as aluminum and a framing element 6 serves to complete the cell assembly. Both the backing sheet and frame, in contact respectively with the elements 4 and 3, may be provided with lateral projections indicated at 5a and 6a, respectively, which may be molded in spaced relation in the translucent body 2 while holes 7 may be drilled in registry with said projections and, for example, tapped to receive suitable terminals for connecting the cell in circuit with a meter, such as a galvanometer as schematically shown in Fig. 8.

In Figs. 3 and 4, we have illustrated a translucent, molded body having a photoelectrical cell embedded therein, the body being molded with a lens, indicated generally at 8 adapting the same for particular uses such as for photographic purposes. A lens for this purpose, being of the plano-convex type, is preferably formed of a multiplicity of tangentially disposed, small spherical lenses 9. These small lenses may be molded as an integral part of the translucent body and are disposed to overlie the light-sensitive element of the cell and in substantially coextensive relation thereto.

The ability to fabricate an article of the foregoing character wherein the lens and preserving body form an integral structure, greatly simplifies the construction of an assembly of this nature and permits of a reduction of the over-all dimensions of a completely protected unit to a minimum.

In Fig. 6, we have illustrated a photoelectrical cell preserved and wholly embedded in a molded body of methyl methacrylate in which is also molded a color filter 10. Color filtration may be effected either by incorporating a color filter as a part of the assembly to be molded in the translucent body or the methyl methacrylate may be tinted or colored in the desired shade and substantially the same results are attained in both instances.

Fig. 5, which is a somewhat enlarged sectional view, illustrates more clearly the formation of the spherical lens in a surface of a molded body and Fig. 7 discloses the relative association of the photoelectrical cell and a color filter when incorporated in a molded body having a lens molded integrally therewith.

It is believed evident that in our invention, we not only provide for complete preservation of a photoelectrical cell against ordinary elemental attack but also provide an article of manufacture which, due to the characteristics of the material employed broadens the range of electromotive forces generated by the cell as compared to the range afforded where glass covers are used thereby increasing the precision of associated meter readings. The ability to embody other elements witin the molded body also renders the resulting article both compact and substantially indestructible.

Furthermore, a plurality or series of cells may be molded in a body of our preferred material and compounded, for example, to provide a higher total output where desired.

What we claim is:

As a new article of manufacture, a photoelectrical cell comprising a light-sensitive element adapted to generate minute electromotive forces when subjected to light and substantially in proportion to the intensity of said light, said cell being molded in a clear, transparent, molded body of methyl methacrylate and wholly enclosed thereby whereby said cell is completely sealed against elemental attack while the intensity of the light falling upon said body is substantially undiminished in its passage therethrough to said cell; and said body being molded to form a lens overlying said light-sensitive element.

ENRIQUE G. TOUCEDA.
JOHN D. LEE, Jr.